(12) United States Patent
Ireland

(10) Patent No.: US 9,754,506 B2
(45) Date of Patent: Sep. 5, 2017

(54) INTERACTIVE COMPUTER PROGRAM WITH VIRTUALIZED PARTICIPANT

(71) Applicant: CAE Inc., Saint-Laurent, Montreal (CA)

(72) Inventor: Alexander Ireland, Montreal (CA)

(73) Assignee: CAE Inc., St-Laurent, QC (CA)

( * ) Notice: Subject to any disclaimer, the term of this patent is extended or adjusted under 35 U.S.C. 154(b) by 0 days.

(21) Appl. No.: 14/674,927

(22) Filed: Mar. 31, 2015

(65) Prior Publication Data
US 2016/0293040 A1  Oct. 6, 2016

(51) Int. Cl.
| | | |
|---|---|---|
| *G09B 9/30* | (2006.01) | |
| *G06F 3/14* | (2006.01) | |
| *G06F 3/01* | (2006.01) | |
| *G09G 3/00* | (2006.01) | |

(52) U.S. Cl.
CPC ............. *G09B 9/301* (2013.01); *G06F 3/011* (2013.01); *G06F 3/1423* (2013.01); *G09G 3/001* (2013.01); *G09G 3/002* (2013.01)

(58) Field of Classification Search
CPC ................................ G09B 9/301; G06F 3/011
USPC .......................................................... 434/38
See application file for complete search history.

(56) References Cited

U.S. PATENT DOCUMENTS

| | | | |
|---|---|---|---|
| 5,137,450 A | | 8/1992 | Thomas |
| 5,224,861 A | * | 7/1993 | Glass ........................ A47C 7/72 244/118.5 |
| 5,240,207 A | * | 8/1993 | Eiband ................. G05D 1/0038 244/190 |

(Continued)

FOREIGN PATENT DOCUMENTS

| | | |
|---|---|---|
| CN | 101251959 | 8/2008 |
| CN | 104269083 | 1/2015 |
| KR | 101191556 | 10/2012 |

OTHER PUBLICATIONS

Dorr et al, "Virtual Cockpit Simulation for Pilot Training", Institute for Flight Mechanics and Control, Technical University Darmstadt, Germany, presented at RTO HFM Workshop on 'What is Essential for Virtual Reality Systems to Meet Military Human Performance Goals?', Apr. 13-15, 2000, pp. 11-1 to 11-7, published in RTO MP-058.

(Continued)

*Primary Examiner* — Thomas Hong
(74) *Attorney, Agent, or Firm* — Gowling WLG (Canada); Benoit Yelle

(57) ABSTRACT

An infrastructure for an interactive computer program comprising a computer generated environment. The infrastructure comprises an instrument module, a first display and a second display. At least one tangible instrument allows the user to interact within the computer generated environment, at least one virtualized instrument is not accessible to the user. The first display displays images from the computer generated environment. The second display is positioned on one side of the instrument module for displaying at least images of the virtualized instrument(s) and of a virtualized participant that has access to the virtualized participant of the interactive computer program. A method comprising providing the tangible instrument and the first display screen The method also comprises displaying images of the virtualized instrument and the virtualized participant on the second display screen.

9 Claims, 9 Drawing Sheets

(56) References Cited

U.S. PATENT DOCUMENTS

| | | | |
|---|---|---|---|
| 5,275,565 A * | 1/1994 | Moncrief | A63F 13/08 345/1.3 |
| H001728 H * | 5/1998 | Kelso | G09B 9/003 434/30 |
| H1728 H | 5/1998 | Kelso | |
| 5,748,867 A | 5/1998 | Cosman et al. | |
| 6,163,336 A | 12/2000 | Richards | |
| 6,196,845 B1 | 3/2001 | Streid | |
| 6,232,932 B1 * | 5/2001 | Thorner | G06F 1/1601 345/1.3 |
| 6,281,651 B1 * | 8/2001 | Haanpaa | B25J 9/1689 318/568.11 |
| 6,459,446 B1 | 10/2002 | Harman | |
| 6,826,523 B1 | 11/2004 | Guy et al. | |
| 7,117,135 B2 | 10/2006 | Cull et al. | |
| 7,825,996 B2 | 11/2010 | Yamada et al. | |
| 8,488,243 B2 | 7/2013 | McKnight et al. | |
| 8,564,622 B1 | 10/2013 | Quinn et al. | |
| 2002/0075210 A1 | 6/2002 | Nestrovic et al. | |
| 2004/0104935 A1 * | 6/2004 | Williamson | G06F 3/012 715/757 |
| 2004/0155286 A1 | 8/2004 | Nestrovic et al. | |
| 2006/0081793 A1 | 4/2006 | Nestrovic et al. | |
| 2006/0114171 A1 | 6/2006 | Vascotto et al. | |
| 2007/0088467 A1 * | 4/2007 | H. Knotts | G01C 23/005 701/14 |
| 2007/0202470 A1 * | 8/2007 | Petruzziello | G09B 9/08 434/29 |
| 2007/0225118 A1 * | 9/2007 | Giorno | A63B 23/00 482/1 |
| 2008/0070196 A1 * | 3/2008 | Luty | G09B 19/16 434/34 |
| 2008/0206720 A1 * | 8/2008 | Nelson | G09B 9/165 434/44 |
| 2008/0217472 A1 * | 9/2008 | Diamandis | A63K 3/00 244/1 R |
| 2009/0098981 A1 * | 4/2009 | Del Giorno | A63B 24/0062 482/9 |
| 2009/0144367 A1 | 6/2009 | Tadokoro | |
| 2009/0292178 A1 * | 11/2009 | Ellis | A63F 13/02 600/301 |
| 2010/0182409 A1 | 7/2010 | Suzuki | |
| 2010/0266992 A1 * | 10/2010 | Gregoire | G09B 9/00 434/38 |
| 2011/0027761 A1 * | 2/2011 | Nunez | G09B 9/042 434/37 |
| 2011/0098109 A1 * | 4/2011 | Leake | A63F 13/213 463/30 |
| 2011/0183301 A1 * | 7/2011 | Turner | G09B 9/302 434/43 |
| 2012/0251995 A1 * | 10/2012 | Ghyme | G09B 5/06 434/362 |
| 2013/0101968 A1 * | 4/2013 | Grabenstetter | G09B 5/02 434/63 |
| 2013/0268205 A1 * | 10/2013 | Aragones | A63B 24/0062 702/19 |
| 2014/0080099 A1 * | 3/2014 | Sowadski | G09B 9/54 434/37 |
| 2014/0186810 A1 | 7/2014 | Falash et al. | |
| 2014/0248588 A1 * | 9/2014 | Williams | G09B 9/006 434/47 |
| 2014/0322674 A1 * | 10/2014 | Livneh | G09B 9/08 434/30 |
| 2015/0050623 A1 * | 2/2015 | Falash | G09B 9/24 434/38 |
| 2015/0079545 A1 | 3/2015 | Kurtz | |
| 2015/0145704 A1 * | 5/2015 | Dahan | G09B 9/30 340/971 |
| 2015/0269860 A1 * | 9/2015 | Shaw | G09B 9/08 434/35 |

OTHER PUBLICATIONS

"Desk Pilot v1.4.2 Shared Cockpit Crew Manual", Harders M., Jun. 30, 2013.

"Flight Simulator First Officer Manual", King M., Aug. 12, 2012.

* cited by examiner

INTERACTIVE COMPUTER PROGRAM WITH VIRTUALIZED PARTICIPANT

PRIORITY STATEMENT

This non-provisional patent application claims priority based upon the PCT patent applications entitled "INTERACTIVE COMPUTER PROGRAM WITH VIRTUALIZED PARTICIPANT", filed on even date herewith, in the name of CAE Inc., the PCT application entitled "NIGHT VISION DETECTION ENHANCEMENTS IN A DISPLAY SYSTEM", filed on even date herewith, in the name of CAE Inc. and the PCT application entitled "MULTIFACTOR EYE POSITION IDENTIFICATION IN A DISPLAY SYSTEM", filed on even date herewith, in the name of CAE Inc., all of which being incorporated by reference in their entirety.

TECHNICAL FIELD

The resent invention relates to an interactive computer program and, more particularly, to a multi-party interactive computer program.

BACKGROUND

Interactive computer programs, such as simulators or, more particularly, flight simulators, typically involve complex display systems meant to emulate a real environment. For the same purpose, an infrastructure that comprises instruments from the real environment or instruments emulating instruments from the real environment is also typically provided. Reference is now made to the drawings in which FIG. 1 shows an example of such an infrastructure in accordance with the prior art. A flight simulator 1000 is depicted that comprises a cockpit 1100 equipped with seats 1110, an instrument module 1120 and window openings 1130 identical to seats, instruments and window openings found in a real plane. In one configuration, a display system is provided at least three feet (90 centimeters) outside of the cockpit 1100 and is visible for the seated users through the windows openings 1130.

To maintain the required level of realism, the number of users of the flight simulator 1000 in normal operation is limited to its number of seats. The present invention provides a solution that alleviates this limitation.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of a first set of embodiments of the present invention is directed to an infrastructure for an interactive computer program comprising a computer generated environment. The infrastructure comprises an instrument module, a first display and a second display. The instrument module comprises at least one tangible instrument for the user to interact within the computer generated environment, the tangible instrument(s) being accessible to a user of the interactive computer program and at least one virtualized instrument not accessible to the user of the interactive computer program. The first display is positioned in front of the user for displaying images from the computer generated environment interactive computer program. The second display is positioned on one side of the instrument module for displaying at least images of the virtualized instrument(s) and of a virtualized participant of the interactive computer program. The tangible instrument is not accessible to the virtualized participant of the interactive computer program and the virtualized instrument(s) is accessible to the virtualized participant of the interactive computer program.

The infrastructure may comprise a seat for the user and the tangible instrument(s) may be accessible while the user is seated.

The virtualized participant may be controlled by artificial intelligence to mimic reactions of a co-user of the interactive computer program.

The infrastructure may further comprise an instructor station for allowing an instructor to participate to the interactive computer program. The instructor station may allow the instructor to participate to the interactive computer program and to participate in additional corresponding interactive computer programs.

The virtualized participant may represent a co-user of the interactive computer program in a second infrastructure. The instrument module may further comprise at least one shared tangible instrument concurrently accessible to the user from the infrastructure, a corresponding shared tangible instrument being concurrently accessible the co-user in the second infrastructure. The instrument module may further comprise an instrument driver for moving the shared tangible instrument(s) based on movements of the corresponding shared tangible instrument from the co-user in the second infrastructure. An instructor station may also be provided for allowing an instructor to participate to the interactive computer program. The instructor station may allow the instructor to participate to the interactive computer program and to participate in additional corresponding interactive computer programs.

The second display may provide a virtual instructor station for managing settings of the interactive computer program.

The infrastructure may further comprise a sightline tracking module for tracking at least one factor of the user's sightline for parallax geometry correction of the images displayed on at least one of the first display and the second display.

A second aspect of the first set of embodiments of the present invention is directed to a method for providing an interactive computer program in an infrastructure. The method comprises providing a tangible instrument for a user to interact with the interactive computer program, a first display screen displaying a computer generated environment of the interactive computer program. The method also comprises displaying images of a virtualized instrument of the interactive computer program on a second display screen and displaying images of a virtualized participant of the interactive computer program on the second display screen. The tangible instrument is not accessible to the virtualized participant and the virtualized instrument is accessible to the virtualized participant.

The method may further comprise controlling the virtualized participant by artificial intelligence to mimic reactions of a co-user of the interactive computer program.

The method may further also comprise allowing an instructor to participate to the interactive computer program from an instructor station. Allowing the instructor to participate to the interactive computer program may further comprise allowing the instructor to participate to the interactive computer program and to participate in additional corresponding interactive computer programs.

The virtualized participant may also represent a co-user of the interactive computer program in a second infrastructure. The method may then comprise providing a second tangible instrument for the co-user to interact with the interactive computer program from the second infrastructure, the second tangible instrument corresponding to the virtualized instrument and the second infrastructure displaying the computer generated environment of the interactive computer program to the co-user. The method may then also comprise displaying images of the tangible instrument as a second virtualized instrument of the interactive computer program to the co-user. The tangible instrument is not accessible to the virtualized participant and the virtualized instrument is accessible to the virtualized participant. In this example, the method may yet further comprise providing at least one shared tangible instrument concurrently accessible to the user from the infrastructure, a corresponding shared tangible instrument being concurrently accessible the co-user in the second infrastructure and moving the shared tangible instrument(s) based on movements of the corresponding shared tangible instrument from the co-user in the second infrastructure. The method may also comprise allowing an instructor to participate to the interactive computer program from an instructor station.

The method may further comprise providing an interactive computer program engine for managing settings of the interactive computer program and/or for managing settings of the infrastructure.

A first aspect of a second set of embodiments of the present invention is directed to a modular infrastructure for an interactive computer program comprising a computer generated environment. The modular infrastructure comprises an instrument module, a first display and a second display. The instrument module comprises at least one tangible instrument for the user to interact within the computer generated environment, the tangible instrument(s) being accessible to a user of the interactive computer program and at least one virtualized instrument not accessible to the user of the interactive computer program. The first display is positioned in front of the user for displaying images from the computer generated environment interactive computer program. The second display is for displaying at least images of the virtualized instrument(s). An instrument position of the instrument module relative to a display position of the second display is customizable in the modular infrastructure to support different configurations of the interactive computer program.

The modular infrastructure may comprise a seat for the user and the at least one tangible instrument may thus be accessible while the user is seated. The second display may be positioned beside the user while seated and may further display images of a virtualized participant of the interactive computer program having access to the virtualized instrument(s).

When the modular infrastructure comprises a seat, a first tangible instrument of the tangible instrument(s) may be positioned between the seat and the first screen and a second tangible instrument of the tangible instrument(s) may be positioned between the seat and the second display. The second tangible instrument may be configurable to be provided on the left of the seat in a first of the different configurations and on the right of the seat in a second of the different configurations.

The second display may be configurable to be provided beside the user in one of the different configurations and in the back of the user in another of the different configurations.

The modular infrastructure may comprise a seat for the user and a second seat for a second user of the modular infrastructure, a first of the tangible instrument(s) being accessible to the user while seated and a second of the tangible instrument(s) being accessible to the second user while seated. The second display may be configurable to be provided while the user and the second are side-by-side in one of the different configurations and in the back of the user and the second user in another of the different configurations. The second display, in one of the different configurations, may also be configurable to be provided facing the user between the user and the second user, wherein the second of the at least one tangible instrument corresponds to the virtualized instrument, the modular infrastructure further comprising a third screen, facing the second user provided between the user and the second user, for displaying at least images of a second virtualized instrument corresponding to the at least one tangible instrument.

The modular infrastructure may further comprise an instructor station for allowing an instructor to participate to the interactive computer program.

The second display may provide a virtual instructor station for managing settings of the interactive computer program.

The modular infrastructure may further comprise a sightline tracking module for tracking at least factor of the user's sightline for geometry correction of the images displayed on at least one of the first display and the second display.

The modular infrastructure may further comprise equipment from a conventional infrastructure. A first configuration of the different configurations may be a two-user configuration and a second of the different configurations may provide a one-user configuration in which only one user position is maintained, the first configuration setting the instrument position for allowing the instrument module to be accessible from the one user position, the display position being set such that the second display fits within the other user position.

A second aspect of the second set of embodiments of the present invention is directed to a method for modifying a modular infrastructure, configured for an interactive computer program in a first configuration. The method comprises repositioning at least one tangible instrument in the modular infrastructure for a second configuration of the interactive computer program. The tangible instrument(s) is adapted for allowing a user, having a first role program in the first configuration, to interact in the interactive computer program under a second role in the second configuration. The method also comprises configuring a position for a virtualized instrument in the second configuration of the interactive computer program and repositioning a display in view of the tangible instrument(s) repositioned in the second configuration and the position of the virtualized instrument in the second configuration of the interactive computer program. The method then comprises displaying at least images of the virtualized instrument at the position in the second configuration on the second display.

The modular infrastructure may be a modifiable conventional infrastructure.

Configuring the position for the virtualized instrument in the second configuration may be performed from a management interface of an engine of the interactive computer program. The method may further comprise managing settings of the interactive computer program and/or settings of the modular infrastructure from the management interface.

The settings may comprise simulation parameters, at least one general lighting parameter and/or at least one ambient temperature parameter.

BRIEF DESCRIPTION OF THE DRAWINGS

Further features and exemplary advantages of the present invention will become apparent from the following detailed description, taken in conjunction with the appended drawings, in which.

DETAILED DESCRIPTION

In accordance with a first set of embodiments of the present invention, an infrastructure is provided for an interactive computer program comprising a computer generated environment. The infrastructure comprises an instrument module, a first display and a second display. The instrument module comprises at least one tangible instrument for the user to interact within the computer generated environment and at least one virtualized instrument not accessible to the user of the interactive computer program. The tangible instrument(s) is accessible to a user of the interactive computer program. The first display is positioned in front of the user and displays images from the computer generated environment interactive computer program. The second display is positioned on one side of the instrument module and (at least) displays images of the virtualized instrument and of a virtualized participant of the interactive computer program. The tangible instrument(s) is not accessible to the virtualized participant of the interactive computer program and the virtualized instrument(s) is accessible to the virtualized participant of the interactive computer program. For instance, the virtualized participant may be a second user in a second infrastructure sharing the same computer generated environment or could be an artificially-generated participant of the interactive computer program.

In accordance with a second set of embodiments of the present invention, a modular infrastructure is provided for an interactive computer program comprising a computer generated environment. The modular infrastructure comprises an instrument module, a first display and a second display. The instrument module comprises at least one tangible instrument for at least one user to interact within the computer generated environment and at least one virtualized instrument not accessible to the user of the interactive computer program. The tangible instrument(s) is accessible to the user(s) of the interactive computer program. The first display is positioned in front of the user(s) and displays images from the computer generated environment interactive computer program. The second display displays at least images of the at least one virtualized instrument, wherein an instrument position of the instrument module relative to a display position of the second display is customizable in the modular infrastructure to support different configurations of the interactive computer program. For instance, a first configuration may require the second display to be one on a right side of a user and a second configuration may require the second display to be behind the user, on the left side of a user or distributed between different locations around the user.

Figure 2:
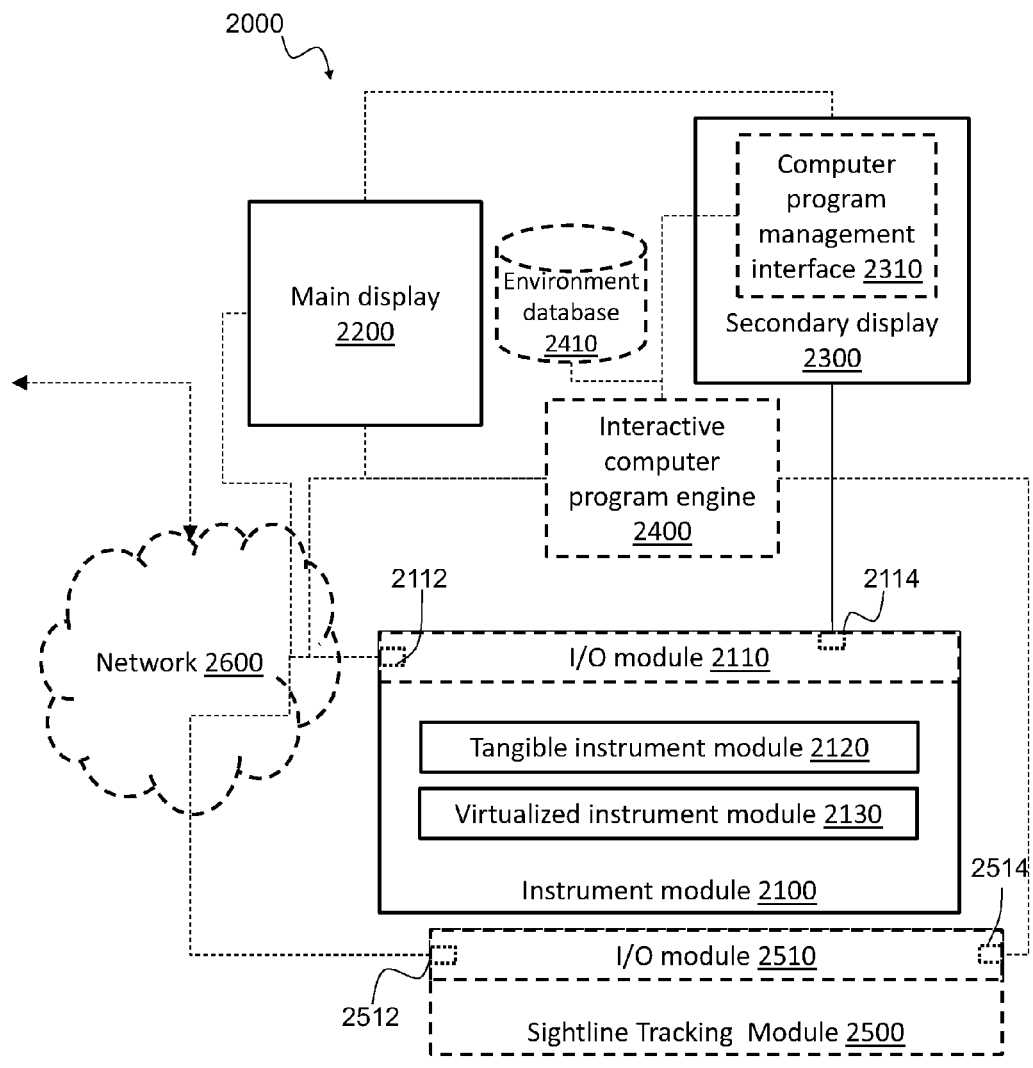
FIG. 2 is a modular representation of an exemplary infrastructure in accordance with the teachings related to at least a first aspect of the present invention.
Figure 3:
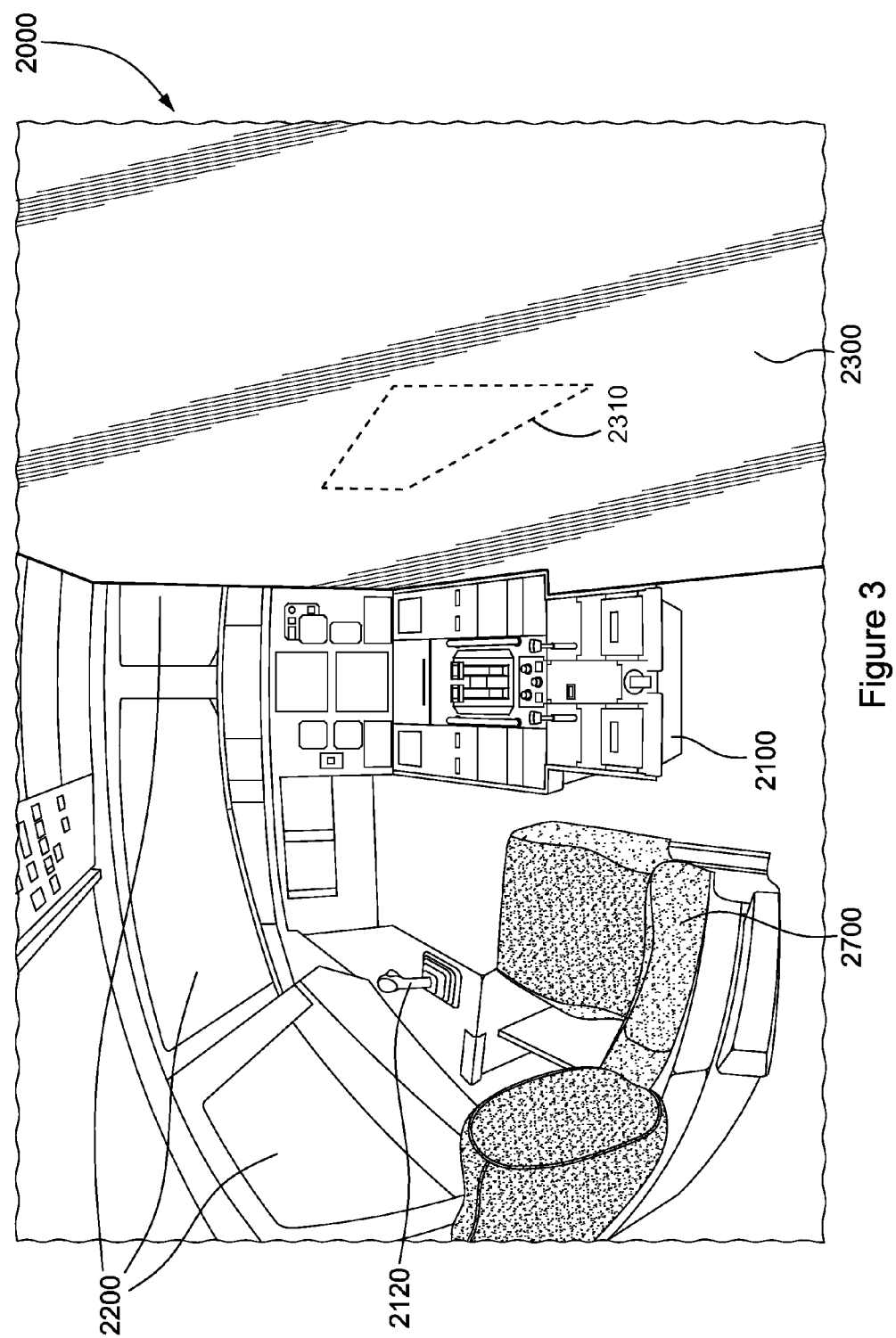
FIG. 3 is a perspective view of an exemplary infrastructure in accordance with the teachings related to at least a first aspect of the present invention.
Figure 4:
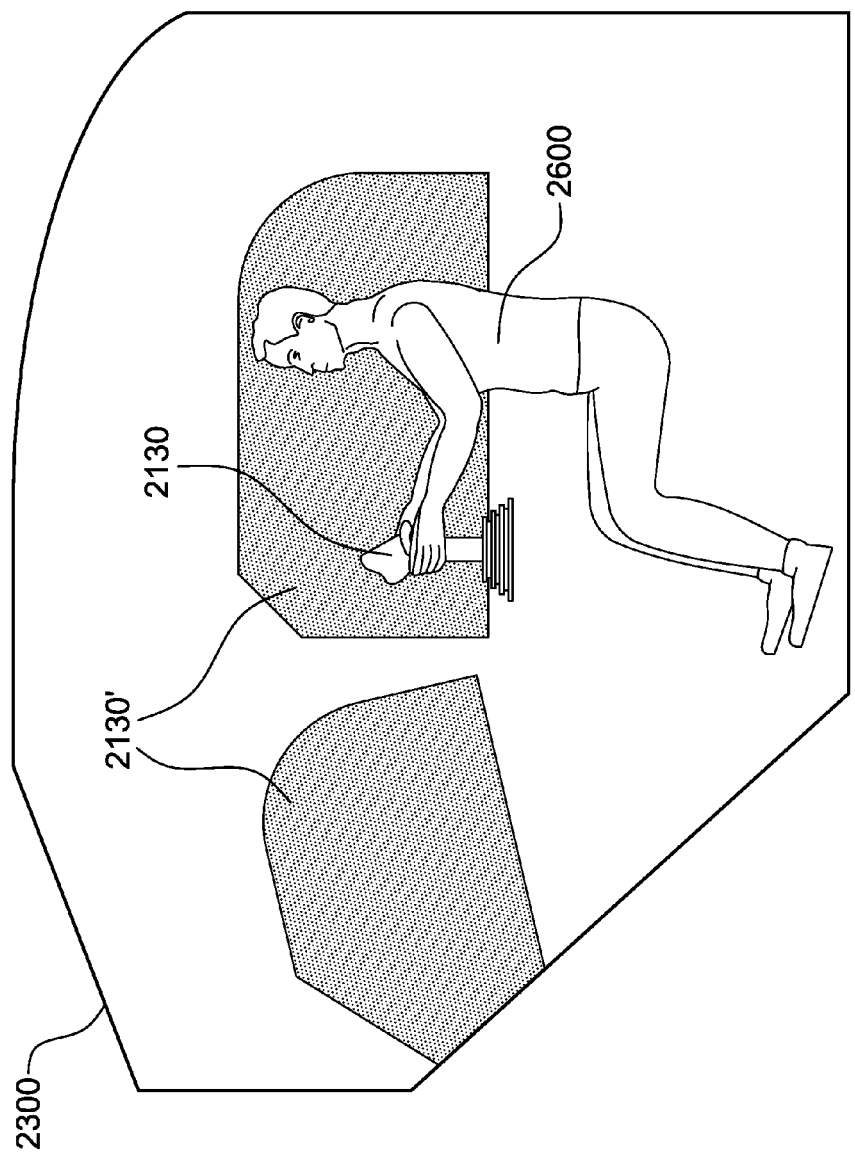
FIG. 4 is a front view of an exemplary secondary display in accordance with the teachings related to at least a first aspect of the present invention.

Reference is now made concurrently to FIG. 2, which shows a logical modular representation of an exemplary infrastructure 2000, FIG. 3, which shows an exemplary modular representation of the exemplary infrastructure 2000, and FIG. 4, which shows a non-perspective view of an exemplary secondary screen 2300 of the exemplary infrastructure 2000, in accordance with the first set of embodiments of the present invention. The infrastructure 2000 is used in the context of an interactive computer program comprising a computer generated environment. The interactive computer program may be a training simulation program such as a flight simulation software, as exemplarily depicted on FIG. 3. The computer generated environment is related to the interactive computer program and may for instance be a virtual representation of a real region of the world or a fictional world where the interactive computer program (e.g., the simulation) can take place (e.g., the Greater Montreal area with a detailed representation of at least some of its airports). The interactive computer program may also be related to a simulation involving a simulated vehicle, which may be terrestrial (car, tank, etc.), underground, airborne (e.g., an aircraft (as exemplarily depicted on FIG. 3), a space shuttle, etc.), floating (e.g., a boat), etc. The interactive computer program may also be related to a game, which could differ from the simulation because of the different rules that apply in the computer generated environment (e.g., varying gravity force, presence of unrealistic elements (force fields), varying response to damages, varied capacity to undo or affect past actions, success measured on different results, etc.).

The infrastructure 2000 comprises an instrument module 2100, a first or main display 2200 and the second or secondary display 2300. The main display 2200 could be split into one or more flat panels fitting one or more openings, as depicted in FIG. 3, but could also be a single flat or curved screen visible though one or more openings. For instance, the main display 2200 may comprise one or more projectors mounted projecting images on a curved refracting screen. The curved refracting screen may be located far enough from the user of the interactive computer program to provide a collimated display. Alternatively, the curved refracting screen may provide a non-collimated display. If and when information about the user's eye position is determined to be required to maintain the expected level of realism, such information about the user's eye position may be obtained using multiple factors, as exemplified in previously identified co-pending applications. The first display 2200 is positioned in front of the user and displays images from the computer generated environment of the interactive computer program.

The instrument module 2100 comprises at least one tangible instrument 2120 for the user to interact within the computer generated environment and at least one virtualized instrument 2130 not accessible to the user of the interactive computer program (i.e., the virtualized instrument 2130 depicted on the secondary display 2300 cannot be manipulated directly by the user). The instrument module 2100 may comprise more than one physical module that may further be interconnected to provide a given configuration of the interactive computer program. Skilled persons will readily acknowledge that the position of the user in relation to the instrument module 2100 and the secondary display 2300 may be changed without affecting the teachings of invention. More specifically, the secondary screen 2300 could be on the left, the right or in the rear of the user of the interactive computer program.

For instance, in relation to an exemplary flight simulator, the tangible instruments 2120 may comprise a control yoke and/or side stick (as exemplarily identified as 2120 on FIG. 3), rudder pedals, a throttle, a flap switch, a transponder, a landing gear lever, a parking break switch, etc. Examples of the at least one virtualized instrument 2130 not accessible to the user may comprise an image of a control yoke and/or side stick (as exemplarily identified as 2130 on FIG. 4), an image of a rudder pedals, an image of a throttle, an image of a flap switch, an image of a transponder, an image of a landing gear lever, an image of a parking break switch, etc.

The tangible instrument(s) 2120 is accessible to a user of the interactive computer program. The second display 2300 is positioned on one side of the instrument module 2100 and (at least) displays images of the virtualized instrument 2130 and of a virtualized participant 2600 of the interactive computer program. The tangible instrument(s) 2120 is not accessible to the virtualized participant 2600 of the interactive computer program and the virtualized instrument(s) 2130 is accessible to the virtualized participant 2600 of the interactive computer program. For instance, the virtualized participant 2600 may be a second user in a second infrastructure (not shown on FIG. 2) sharing the same computer generated environment or could be an artificially-generated participant of the computer program.

The secondary display 2300 may be a single custom-shaped flat screen, but could also be a single regular-shaped flat screen, an array of smaller screens or any other type of display that allows for a representation of the virtualized participant 2600 and the virtualized instrument(s) 2130. It is also expected that the secondary display 2300 could be a curved and/or foldable screen that may be tailored to a specific configuration of the physical space that the secondary display 2300 can occupy. The secondary display 2300 may also be formed by one or more projectors and one or more screens. Many projectors may project images on a single screen or on multiple screens. Likewise, a single projector may project images on multiple screens. The projector(s) may be located within the infrastructure 2000 or outside the infrastructure 2000, projecting images on the secondary display 2300 within the infrastructure 2000. The representation of the virtualized participant 2600 and the virtualized instrument(s) 2130 may cover the whole visible field from the perspective of the user (as exemplified by the full scale single custom-shaped flat screen as depicted in FIG. 3 and FIG. 4 or as a foldable/curved screen may be able to provide) but could also be limited in size and provide a limited visible field of view for the user (e.g., using single regular-shaped flat screen). The secondary display 2300 may also provide images from selected portions of the whole visible field from the perspective of the user, e.g., using the array of smaller screens. The secondary display 2300 could be symmetrical along the vertical axis (e.g., so that it can be flipped horizontally to be used on different sides of the instrument module 2100).

The images displayed on the secondary display 2300 may also provide images of the computer generated environment of the interactive computer program, e.g., through displayed virtual openings 2130' as depicted on FIG. 4.

Skilled persons will recognize that the images displayed on the secondary display 2300 may advantageously take into account an expected position of the user's eye and/or the user's sightline to display sufficiently realistic virtual participant 2600 and virtualized instrument(s) 2130 (i.e., with at least a basic geometry correction, e.g., to simulate perspective and parallax effect). The expected position of the eyes or sightline of the user may be a static value entered for any users, a static value determined for each user (e.g., based on biometric values) or may be dynamically computed. The eye position or sightline may comprise only a basic position of the user's body or user's body part or may further comprise the user's eye-level height and horizontal rotational attitude at the eye-level, which is of particular relevance when 3D images are displayed on the main display 2200 and/or secondary display 2300. For instance, in one embodiment of the first set of embodiments, the infrastructure 2000 may further comprise a sightline tracking module 2500 for tracking, at runtime (i.e., during execution of the interactive computer program), at least one factor of the user's sightline for geometry correction of the images displayed on at least one of the first display 2200 and the second display 2300. Because of the proximity of the secondary display 2300, the sightline tracking module 2500 when applied to the secondary display 2300, while it is an optional feature, is expected to significantly improve realism of the interactive computer program as perceived by the user. Of course, depending on the technology used for the main display 2200, the sightline tracking module 2500 may also be significant, while it is an optional feature, to improve realism of the interactive computer program as perceived by the user.

The user, in the infrastructure, may be standing or in motion. The infrastructure 2000 may also comprise a seat 2700 for the user. In this example, the tangible instrument(s) 2120 is accessible while the user is seated, standing or in motion.

The virtualized participant 2600 may be controlled by artificial intelligence to mimic actions and reactions of a co-user generated by the interactive computer program.

The infrastructure 2000 may further comprise an interactive computer program engine 2400 (e.g., simulation engine) for managing settings of the interactive computer program (e.g., simulation parameters) and/or of the infrastructure 2000 (e.g., general lighting, ambient temperature). The interactive computer program engine 2400 may for instance manage the computer generated environment loaded from an environment database 2410 and may also influence the interactive computer program behavior (e.g., by implementing certain interactive sessions or simulation scenarios, etc.). The interactive computer program engine 2400, when present, may comprise a network interface module (not shown) and/or dedicated wire or wireless interfaces (not shown) to interact with other modules of the infrastructure 2000 or with other external network modules (e.g., one or more additional infrastructures and/or a shared or dedicated instructor module), for instance, via a network 2900.

The infrastructure 2000 may also comprise dedicated image generators (not shown) for the main display 2200 and/or the secondary display 2300. The interactive computer program engine 2400 may further comprise or may further interact with the dedicated image generators.

The infrastructure 2000 may further comprise a computer program management interface 2310, which may be displayed on the secondary display 2300 or may also be provided on at least one extra device (not shown) such as a wired touch-sensitive display, a tablet computer, a portable computer or a smart phone. The extra device could be located in close proximity with the user and the infrastructure 2000, but may also be provided outside of the infrastructure 2000, in communication therewith. When multiple extra devices are used, they present different views of the computer program management interface 2310 (e.g., to manage different aspects therewith) or may they may all present the same view thereof. The computer program management interface 2310 may also be permanently shown (e.g., on the secondary display 2300), may be triggered by a touch gesture when the secondary screen is touch sensitive and/or may be triggered by an event in the interactive computer program (e.g., milestone reached, unexpected action from the user, or action outside of expected parameters, success or failure of a certain mission, etc.). The computer program management interface 2310 may provide a virtual instructor station that allows the user to interact with the interactive computer program engine 2400 for at least managing settings of the interactive computer program and/or of the infrastructure 2000. Someone else present with the user (e.g., an instructor) may also be in control of the computer program management interface 2310 (e.g., on a portion of the secondary display 2300 not easily accessible to the user or on the extra device).

The instrument module 2100 may further comprise a dedicated input/output (I/O) module 2110. Likewise, the sightline tracking module 2500 may also comprise an I/O module 2510. An interface 2114/2514 of the I/O module 2110/2510 may be used to interact with the secondary display 2300 to provide and/or affect the images. The interactions between instrument module 2100, the sightline tracking module 2500 and/or the secondary display 2300 may be direct interactions (e.g., via the I/O interface 2114) of via other modules (e.g., interactive computer program engine 2400), which may be dedicated to the image generation (not shown). The I/O module 2110/2510 may also comprise a network interface 2112/2512 for communicating with other modules of the infrastructure 2000 or with other external network modules (e.g., one or more additional infrastructures and/or a shared or dedicated instructor module), for instance, via the network 2900.

The secondary display 2300, in addition to the virtual participant 2600, may also provide images of additional virtual participant(s) perceived by the user(s) as being positioned beside the virtual participant 2600. In the depicted example of FIG. 3 and FIG. 4, a single secondary display 2300 is provided. Skilled persons will recognize that the user could be positioned between the secondary display 2300 and an additional display (not shown). The user would then perceive as being positioned between or among two or more virtual participants. Similarly, the additional display could be provided (in addition or alternatively) behind the user, e.g., to display passengers and/or additional virtual participants of the interactive computer program (e.g., gunner(s) in a military helicopter). The user(s) could be seated and/or standing and/or in motion in the infrastructure 2000. Likewise, the virtual participant(s) may be depicted as being seated and/or standing and/or in motion.

Figure 5:
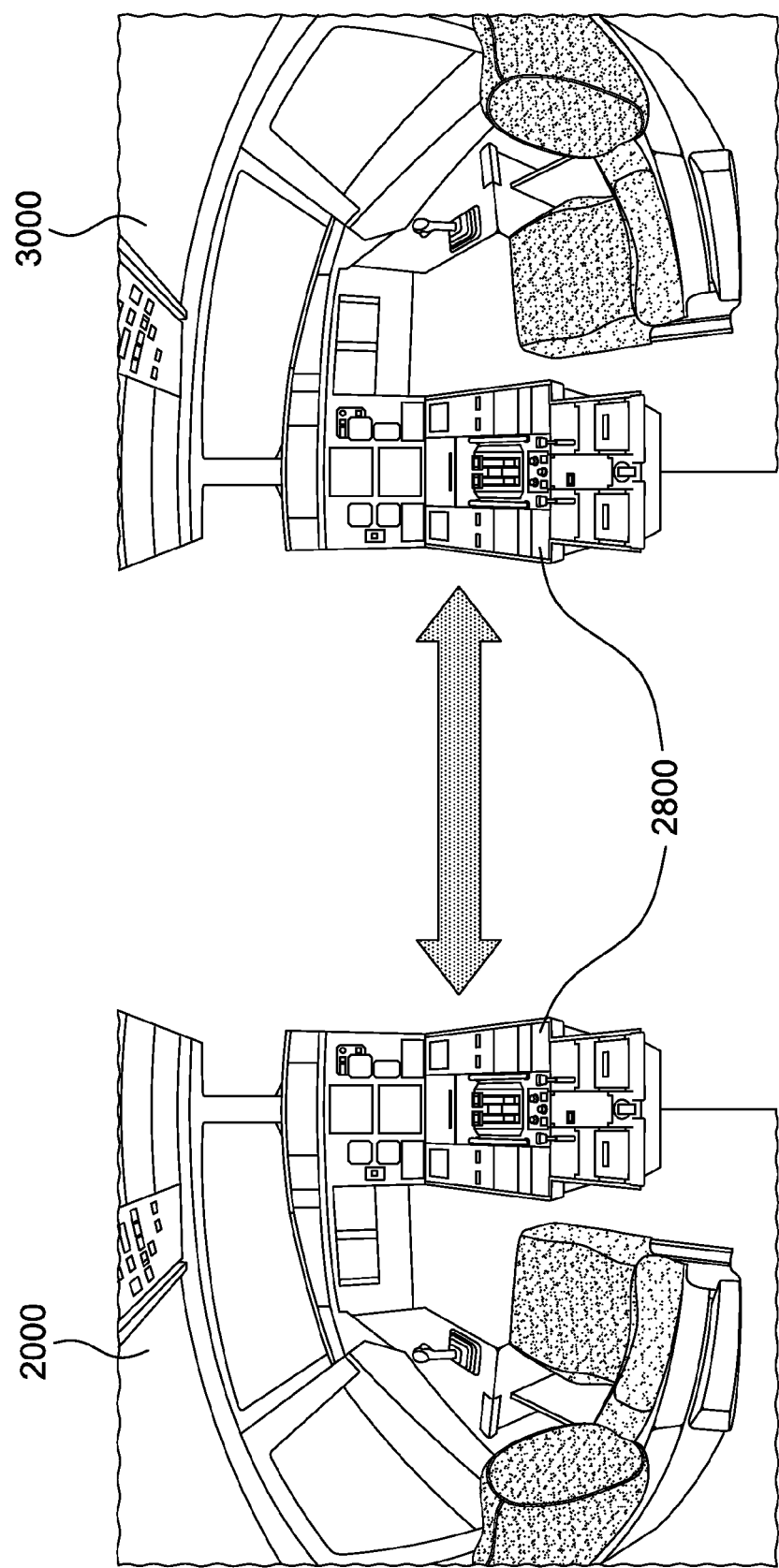
FIG. 5 is a modified perspective view of exemplary infrastructures in accordance with the teachings related to at least a first aspect of the present invention.

FIG. 5 shows an exemplary dual configuration in accordance with one aspect of the first set of embodiments of the present invention. The infrastructure 2000 is depicted on the left (the secondary display 2300 being omitted for increased clarity). A second complementary infrastructure 3000 is depicted on the right. The virtualized participant 2600 represents a real co-user of the interactive computer program in the second infrastructure 3000. Likewise, a second virtual participant (not shown) is displayed in the second infrastructure 3000 to represent the user of the interactive computer program in the infrastructure 2000.

The infrastructures 2000 and 3000 may be equipped with one or multiple cameras (not shown) to mimic movements of the virtual participant(s). Alternatively or complementarily, the virtual participants may move in accordance with the virtualized instrument(s) being manipulated in the corresponding infrastructure. As depicted in the example of FIG. 3, the instrument module 2100 may further comprise at least one shared tangible instrument 2800 concurrently accessible to the user from the infrastructure 2000, a corresponding shared tangible instrument 2800 being concurrently accessible the real co-user in the second infrastructure 3000. An instrument actuator may further be provided for moving the shared tangible instrument(s) 2800 based on movements of the corresponding shared tangible instrument 2800 from the real co-user in the second infrastructure 3000.

The virtualized instrument 2130 may also be made accessible to the user as an additional shared instrument by configuring the computer program management interface 2310. For instance, by using the computer program management interface 2310, the user may be able to configure virtual switches displayed at an inaccessible location on the secondary display 2300 to be actionable using an additional display of the virtual switches on a specific touch sensitive portion of the secondary display 2300 or on an extra device (tablet, portable computer, smartphone, etc.).

Figure 6:
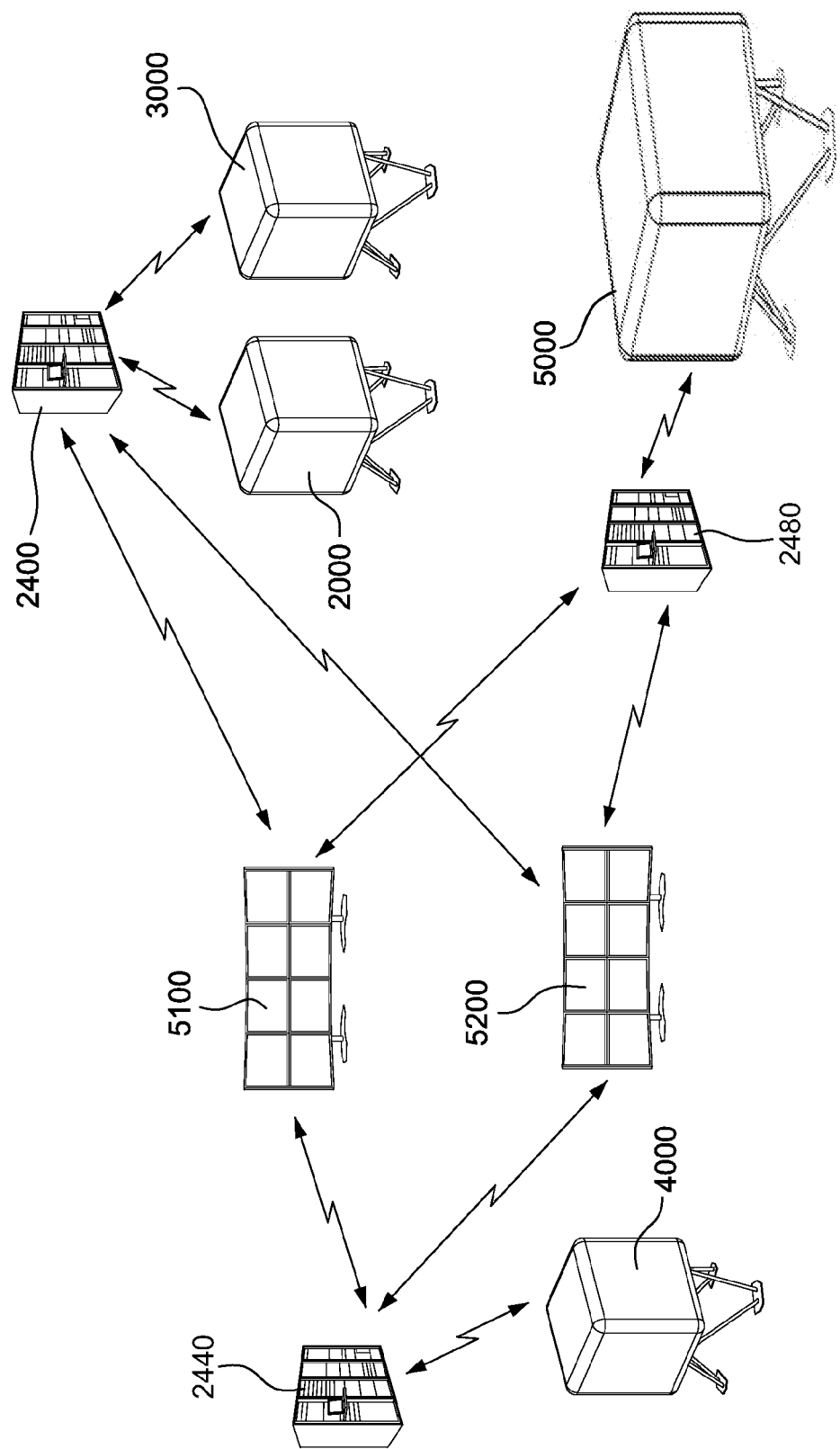
FIG. 6 is a modular and functional representation of an exemplary system in accordance with the teachings related to at least a first aspect of the present invention.

FIG. 6 shows an exemplary system view of a plurality of cooperating infrastructures 2000 . . . 5000 in accordance with one aspect of the first set of embodiments of the present invention. In this example, one or more instructor stations 5100, 5200 are provided for allowing one or more instructors to participate to one or more interactive computer programs. In the depicted example of FIG. 6, the infrastructures 2000 and 3000 are sharing the interactive computer program, as exemplified with particular reference to FIG. 5 and the interactive computer program engine 2400 is present and depicted as a server in communication with the infrastructures 2000 and 3000. Skilled persons will readily recognize that the interactive computer program engine 2400 is an optional feature of the present invention and that it may be integrated within one or more of the infrastructures 2000 and 3000 and/or distributed over other engines (2440, 2480) and/or over a cloud processing engine (not shown). In the example of FIG. 6, the infrastructure 4000 is managed by the engine 2440, which also generates an artificial intelligent co-user therefor (which may be referred to as an AI infrastructure). The infrastructure 5000 is depicted as a conventional two-seat infrastructure managed by the engine 2480. The infrastructure 5000 may be used in standalone mode (or conventional mode), but may also be configured such that a single user of the infrastructure 5000 may interact with a remote infrastructure (not shown) and/or an AI infrastructure. The infrastructure 5000 may also be configured such that the two users thereof interact with the remote or AI infrastructure (e.g., in a multi-user, multi-site configuration). One or more additional infrastructures (not shown) may be provided with the virtual participant being in collocated infrastructure(s), remote infrastructure(s) and/or controlled by artificial intelligence (as standalone stations or within a network of infrastructures as depicted on FIG. 6). In addition, as skilled person will readily recognize, while a role could be permanently assigned thereto, any of the infrastructures 2000 . . . 5000 is expected to be configurable for being usable as a collocated cooperating infrastructure and a remotely cooperating infrastructure.

Figure 9:
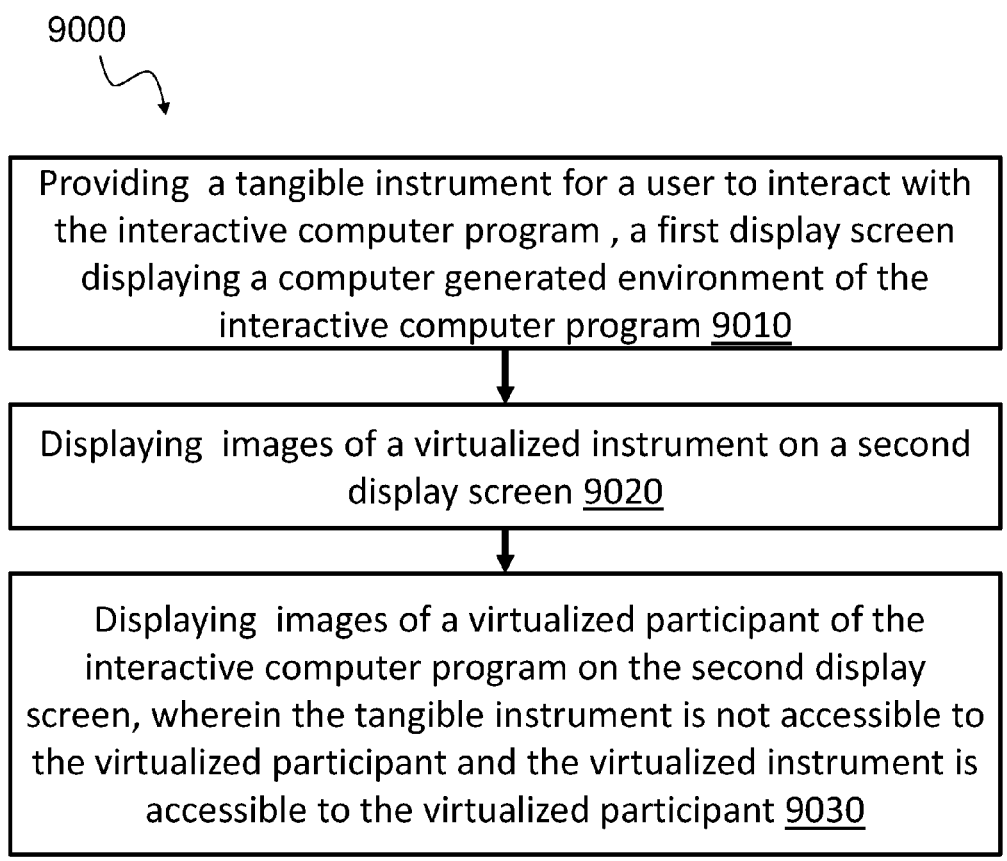
FIG. 9 is a flow chart of an exemplary method in accordance with the teachings related to at least a second aspect of the present invention.

FIG. 9 shows a flow chart of an exemplary method 9000 for providing the interactive computer program in the infrastructure 2000 in accordance with one aspect of the first set of embodiments, as described with reference to FIG. 2. The method 9000 comprises providing 9010 a tangible instrument for a user to interact with the interactive computer program, a first display screen displaying a computer generated environment of the interactive computer program. The method also comprises displaying 9020 images of a virtualized instrument of the interactive computer program on a second display screen and displaying 9030 images of a virtualized participant of the interactive computer program on the second display screen. The tangible instrument is not accessible to the virtualized participant and the virtualized instrument is accessible to the virtualized participant.

The method 9000 may further comprise controlling the virtualized participant by artificial intelligence to mimic reactions of a co-user of the interactive computer program. The method 9000 may also comprise allowing an instructor to participate to the interactive computer program from an instructor station. The instructor may participate to the interactive computer program and to additional corresponding interactive computer programs.

The virtualized participant may also represent a co-user of the interactive computer program in a second infrastructure; the method 9000 may then comprise providing a second tangible instrument for the co-user to interact with the interactive computer program from the second infrastructure. The second tangible instrument corresponds to the virtualized instrument and the second infrastructure displays the computer generated environment of the interactive computer program to the co-user. The method 9000 may then further comprise displaying images of the tangible instrument as a second virtualized instrument of the interactive computer program to the co-user. The tangible instrument is not accessible to the virtualized participant and the virtualized instrument is accessible to the virtualized participant. The method 9000 may then further comprise providing at least one shared tangible instrument concurrently accessible to the user from the infrastructure, a corresponding shared tangible instrument being concurrently accessible the co-user in the second infrastructure and moving the at least one shared tangible instrument based on movements of the corresponding shared tangible instrument from the co-user in the second infrastructure. The method 9000 may yet further comprise allowing an instructor to participate to the interactive computer program from an instructor station.

The method 9000 may also further comprise providing an interactive computer program engine for managing settings of the interactive computer program and/or for managing settings of the infrastructure.

Figure 7:
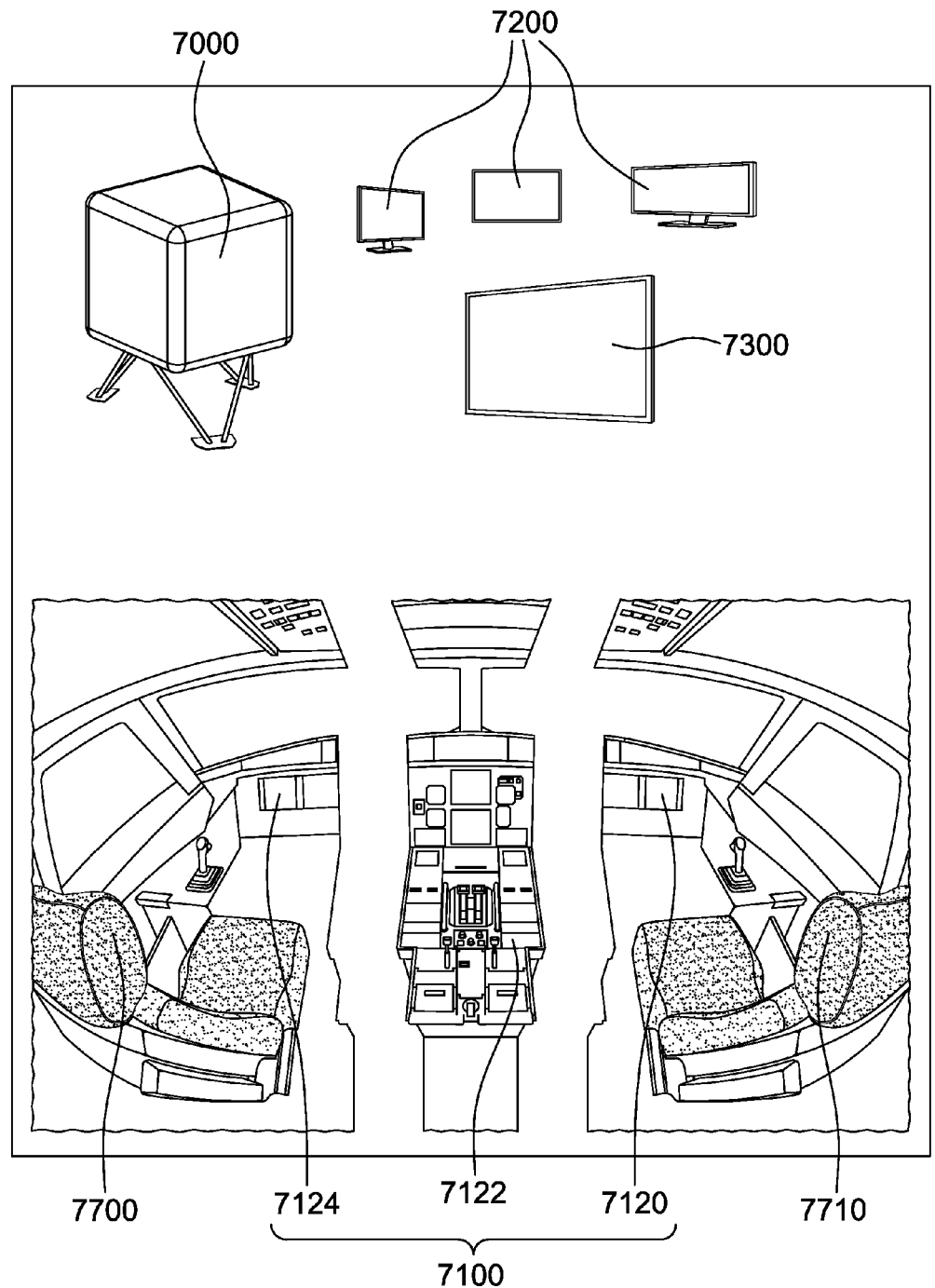
FIG. 7 is an exploded view of different components compatible with a modular infrastructure in accordance with the teachings related to at least a second aspect of the present invention.

In accordance with the second set of embodiments of the present invention, a modular infrastructure is provided. FIG. 7 shows different components that may be fitted into a modular infrastructure 7000 for an interactive computer program comprising a computer generated environment. The modular infrastructure 7000 comprises an instrument module 7100, a first display 7200 and a second display 7300. The instrument module 7100 comprises at least one tangible instrument 7120 for the user to interact within the computer generated environment and at least one virtualized instrument (not shown) not accessible to the user of the interactive computer program. The at least one tangible instrument is accessible to the user of the interactive computer program.

In a first configuration of the modular infrastructure 7000, the first display 7200 is positioned in front of the user for displaying images from the computer generated environment interactive computer program. The second display is for displaying at least images of the at least one virtualized instrument. An instrument position of the instrument module 7100 relative to a display position of the second display 7300 is customizable in the modular infrastructure 7000 to support at least one additional configuration of the interactive computer program different from the first configuration.

The second display 7300 may be a single custom-shaped flat screen, but could also be a single regular-shaped flat screen, an array of smaller screens or any other type of display. It is also expected that the second display 7300 could be a curved and/or foldable screen that may be tailored to a specific configuration of the physical space that the second display 7300 can occupy, which differs between configurations. The second display 7300 could be symmetrical along the vertical axis (e.g., so that it can be flipped horizontally to be used on different sides of the instrument module 7100). The second display 7300 could be double sided where both sides are active at once or where one side at a time is active. The second display 7300 may also be formed by one or more projectors and one or more screens. Many projectors may project images on a single screen or on multiple screens. Likewise, a single projector may project images on multiple screens. The projector(s) may be located within the modular infrastructure 7000 or outside the modular infrastructure 7000, projecting images on the second display 7300 within the modular infrastructure 7000.

The modular infrastructure 7000 may further comprise a seat 7700 for the user, the at least one tangible instrument being accessible while the user is seated. The second display 7300 may be positioned beside the user while seated and may also be for further displaying images of a virtualized participant of the interactive computer program having access to the at least one virtualized instrument.

A first tangible instrument 7124 of the at least one tangible instrument may be positioned between the seat 7700 and the first screen 7200 and a second tangible instrument 7122 of the at least one tangible instrument is positioned between the seat 7700 and the second display 7300. The second tangible instrument 7122 may further be configurable to be provided on the left of the seat 7700 in the first of the different configurations and on the right of the seat in a second of the different configurations. The second display 7300 may also be configurable to be provided beside the user in one of the different configurations and in the back of the user in another of the different configurations. The second display 7300 may also be formed by a single or a plurality of different screens in one location around the user (e.g., behind the user) or in multiple locations around the user (e.g., behind and on the right of the user).

A second seat 7710 for a second user may be provided in some configurations of the modular infrastructure 7700. A first of the at least one tangible instrument 7124 may be accessible to the user while seated and a second of the at least one tangible instrument 7120 may be accessible to the second user while seated. The second display 7300 may be configurable to be provided while the user and the second are side-by-side in one of the different configurations, thereby allowing the two users to be distant in the interactive computer program (e.g., having virtualized participant(s) between them). The second display 7300 may be configurable to be provided in the back of the user and the second user in another of the different configurations (e.g., allowing the two users to be in a vehicle that looks much larger or that involve additional virtual participant(s)).

The second display 7300, in one of the different configurations, is configurable to be provided facing the user between the user and the second user wherein the second of the at least one tangible instrument 7120 corresponds to the virtualized instrument, the modular infrastructure 7000 further comprising a third screen (not shown), facing the second user provided between the user and the second user, for displaying at least images of a second virtualized instrument corresponding to the at least one tangible instrument 7124.

An instructor station (not shown) may also be provided for allowing an instructor to participate to the interactive computer program. The second display 7300 may also, additionally or alternatively, provide a virtual instructor station for managing settings of the interactive computer program.

The modular infrastructure 7000 may further comprise a sightline tracking module for tracking at least factor of the user's sightline for geometry correction of the images displayed on at least one of the first display 7200 and the second display 7300.

Figure 1:
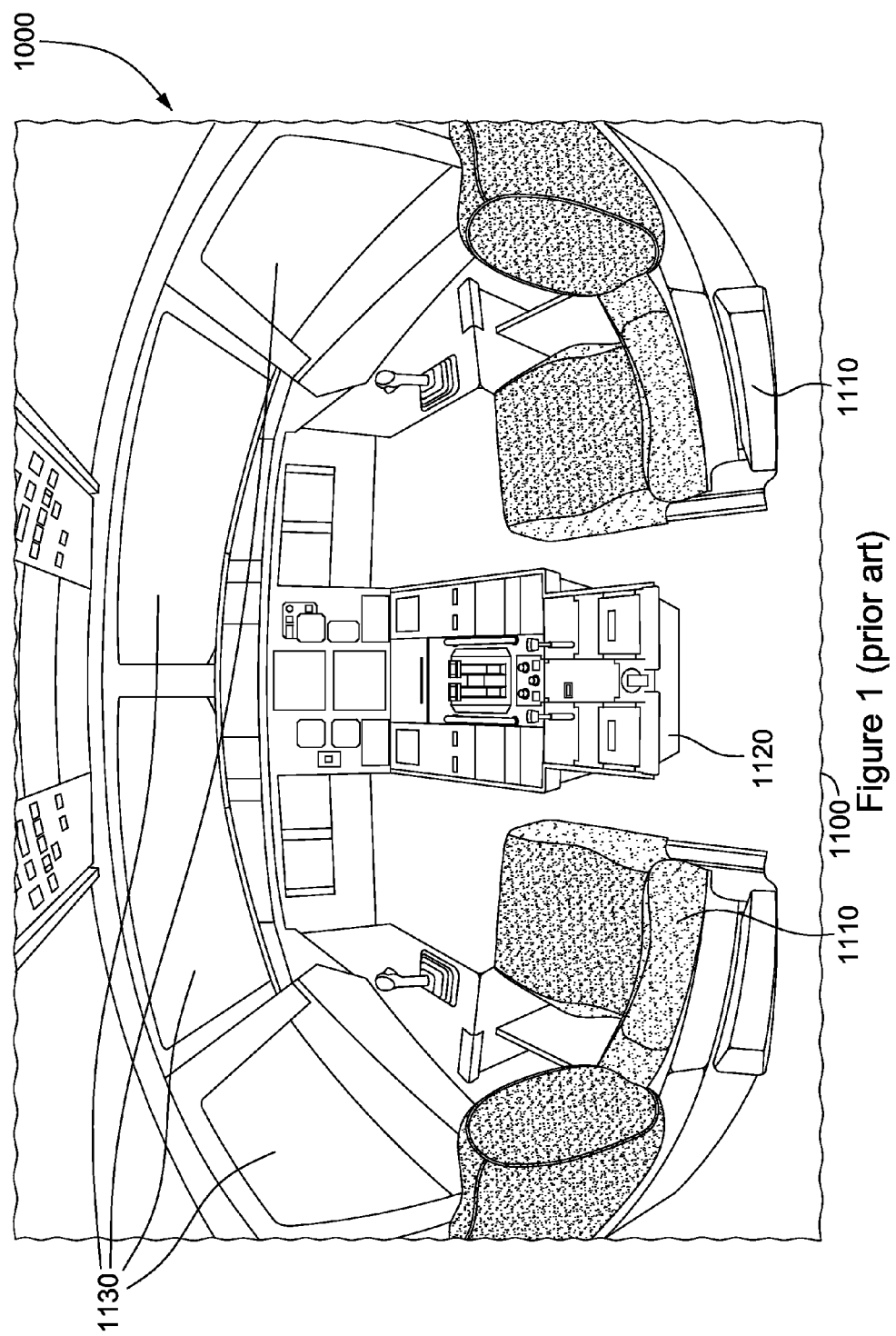
FIG. 1 is a perspective view of an infrastructure in accordance with the prior art.

A conventional multi-user infrastructure (e.g., as the one depicted in FIG. 1 or as the infrastructure 5000) may also be modified in accordance with the teachings of the present invention to accommodate the secondary display 7300 while the number of users of the infrastructure remains the same, thereby allowing a higher number of participants (real co-users or AI users) as additional virtual participants to be depicted therein. Alternatively, the secondary display 7300 may replace one of the position or be adapted to fit within the position of an expected user in the conventional infrastructure (e.g., the left or right seat in FIG. 1 is equipped or replaced with the secondary display 7300). The conventional infrastructure may thus be permanently modified into the modified infrastructure or may also be temporarily modifiable into the modified infrastructure, based on different needs. The modified infrastructure may then be used for one user (or at least a lower number of users) compared to the conventional infrastructure. This may allow maximizing use time of the modifiable/modified infrastructure as it may be easier to fully book the schedule, e.g., when users from different infrastructures (or even different locations, e.g., distributed in training locations around the world) may enter the same interactive computer program or when one or more users is missing and still be able to enter the interactive computer program with one or more AI participants.

Figure 8:
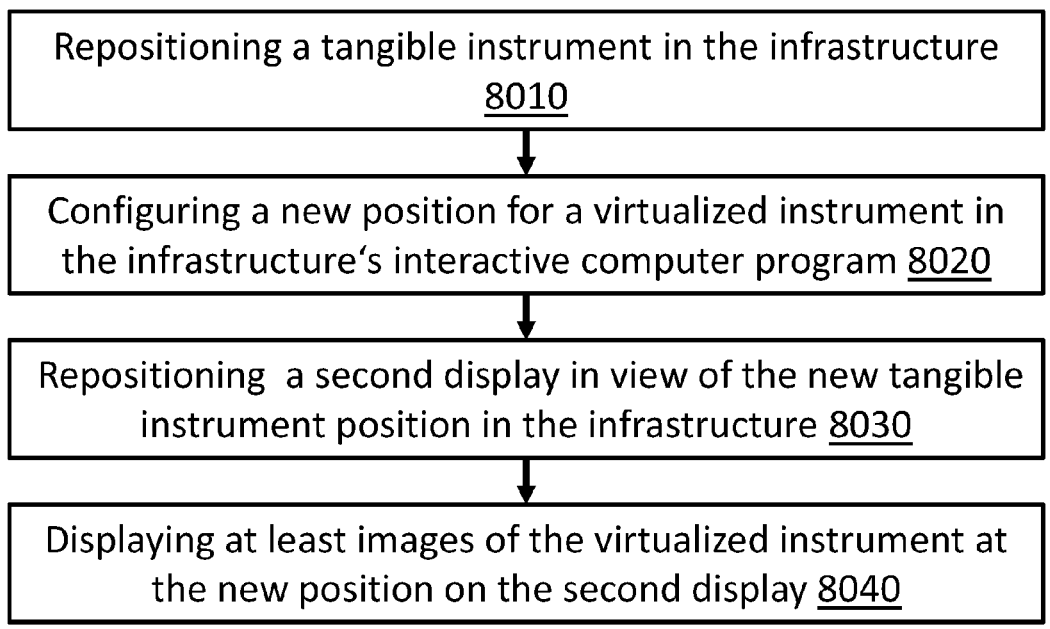
FIG. 8 is a flow chart of an exemplary method in accordance with the teachings related to at least a first aspect of the present invention.

FIG. 8 shows a flow chart of an exemplary method 8000 in accordance with the second set of embodiments of the present invention. The method 8000 is for modifying a modular infrastructure 7000 initially configured for an interactive computer program in a first configuration. The method 8000 comprises repositioning 8010 at least one tangible instrument in the modular infrastructure for a second configuration of the interactive computer program. The at least one tangible instrument is adapted for allowing a user, having a first role in the interactive computer program in the first configuration, to interact in the interactive computer program under a second role in the second configuration. The method also comprises configuring 8020 a position for a virtualized instrument in the second configuration of the interactive computer program and repositioning 8030 a display in view of the at least one tangible instrument repositioned in the second configuration and the position of the virtualized instrument in the second configuration of the interactive computer program. The method then comprises displaying 8040 at least images of the virtualized instrument at the position in the second configuration on the second display.

The configuring 8020 of the position for the virtualized instrument in the second configuration may be performed from a management interface of an engine of the interactive computer program. The interactive computer program engine (e.g., simulation engine) may also allow, in addition to the position for the virtualized instrument in the different configurations, management of different settings of the interactive computer program (e.g., simulation parameters) and/or of the modular infrastructure 7000 (e.g., general lighting, ambient temperature). The interactive computer program engine may for instance manage the computer generated environment loaded from an environment database (not shown) and may also influence the interactive computer program behavior (e.g., by implementing certain interactive sessions or simulation scenarios, etc.). The interactive computer program engine, when present, may comprise a network interface module (not shown) and/or dedicated wire or wireless interfaces (not shown) to interact with other modules of the modular infrastructure 7000 or with other external network modules (e.g., one or more additional infrastructures and/or a shared or dedicated instructor module), for instance, via a network.

Even though explicit mention(s) of possible synergy between the first set of embodiments and the second set of embodiments of the present invention have not necessarily been made throughout the description, skilled persons will be able to appreciate that their features may advantageously be used completely or partially together to provide even more advantageous embodiments of the present invention.

Similarly, even though explicit mentions of memory module(s) and/or processor module(s) are not made throughout the description of the present examples, persons skilled in the art will readily recognize that such modules are used in conjunction with other modules of the infrastructures to perform routine as well as innovative steps related to the present invention. The processor module may represent a single processor with one or more processor cores or an array of processors, each comprising one or more processor cores. The memory module may comprise various types of memory (different standardized or kinds of Random Access Memory (RAM) modules, memory cards, Read-Only Memory (ROM) modules, programmable ROM, etc.). The network interface represents at least one physical interface that can be used to communicate with other network nodes. The network interface may be present in one or more of the modules of the infrastructure and may be made visible to the other modules of the infrastructure through one or more logical interfaces. The actual stacks of protocols used by the physical network interface(s) and/or logical network interface(s) of the network interface do not affect the teachings of the present invention. The variants of processor module, memory module, network interface and database(s) usable in the context of the present invention will be readily apparent to persons skilled in the art.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. An infrastructure for an interactive computer program comprising a computer generated environment, the infrastructure comprising:

an instrument module replicating a first portion and a third portion of a cockpit from a simulated vehicle, wherein the interactive computer program simulates the simulated vehicle of the computer generated environment and wherein a second infrastructure replicates a second portion and the third portion of the cockpit from the simulated vehicle, the instrument module comprising:
at least one tangible instrument for at least one user to interact within the computer generated environment, the at least one tangible instrument being accessible to the at least one user of the interactive computer program, the at least one tangible instrument being relevant for the simulated vehicle of the computer generated environment;
at least one virtualized instrument not accessible to the at least one user of the interactive computer program, the at least one virtualized instrument being relevant for the simulated vehicle of the computer generated environment;
at least one shared tangible instrument, replicating the third portion of the cockpit, accessible to the at least one user, wherein a corresponding shared tangible instrument, replicating the third portion of the cockpit, is accessible to a real co-user of the interactive computer program in the second infrastructure, wherein the third portion of the cockpit of the simulated vehicle is different from the first portion of the cockpit and from the second portion of the cockpit in the second infrastructure; and
an instrument actuator for moving the at least one shared tangible instrument based on movements of the corresponding shared tangible instrument from the real co-user in the second infrastructure;
a first display positioned in front of the at least one user for displaying images from the computer generated environment of the interactive computer program; and
a second display positioned on one side of the instrument module for:
displaying at least images of the at least one virtualized instrument and of a virtualized participant of the interactive computer program representing the real co-user, wherein the tangible instrument is not accessible to the virtualized participant of the interactive computer program and the at least one virtualized instrument is accessible to the virtualized participant of the interactive computer program; and
displaying complementary images of the cockpit of the simulated vehicle, the complementary images comprising images of the at least one virtualized instrument and of the virtualized participant of the interactive computer program in the cockpit of the simulated vehicle.

2. The infrastructure of claim 1 further comprising a seat for the at least one user, the at least one tangible instrument being accessible while the at least one user is one of being seated, in motion or standing.

3. The infrastructure of claim 1, wherein the virtualized participant is controlled by artificial intelligence to mimic reactions of the real co-user of the interactive computer program.

4. The infrastructure of claim 1 further comprising a sightline tracking module for tracking at least one factor of the user's sightline for geometry correction of the images displayed on at least one of the first display and the second display.

5. The infrastructure of claim 1, wherein the first portion of the cockpit of the simulated vehicle in the infrastructure is different from the second portion of the cockpit of the simulated vehicle in the second infrastructure.

6. A method for providing an interactive computer program in a first infrastructure and a second infrastructure, the method comprising:

providing a tangible instrument, in the first infrastructure, replicating only a first portion of a cockpit from a simulated vehicle, for at least one user to interact with the interactive computer program, wherein a first display screen of the first infrastructure displays a computer generated environment of the interactive computer program and wherein the interactive computer program simulates the simulated vehicle of the computer generated environment, the tangible instrument being relevant for the simulated vehicle of the computer generated environment;
providing a second tangible instrument, in the second infrastructure, replicating only a second portion of the cockpit from the simulated vehicle, for a real co-user to interact with the interactive computer program from the second infrastructure, wherein a first display screen of the second infrastructure displays the computer generated environment of the interactive computer program to the real co-user;
providing at least one shared tangible instrument in the first infrastructure replicating a third portion of the cockpit, different from the first portion, accessible to the at least one user in the first infrastructure;
providing a corresponding shared tangible instrument in the second infrastructure replicating the third portion of the cockpit, different from the second portion, accessible to the real co-user in the second infrastructure;
in the first infrastructure, displaying images of a virtualized instrument of the interactive computer program on a second display screen of the first infrastructure positioned on one side of the tangible instrument, the at least one virtualized instrument being relevant for the simulated vehicle of the computer generated environment and the second tangible instrument corresponding to the virtualized instrument;
in the first infrastructure, displaying images of a virtualized participant of the interactive computer program, representing the real co-user, on the second display screen, wherein the tangible instrument is not accessible to the virtualized participant and the virtualized instrument is accessible to the real co-user;

in the second infrastructure, displaying images of the tangible instrument from the first infrastructure as a second virtualized instrument of the interactive computer program to the real co-user, wherein the tangible instrument from the first infrastructure is not accessible to the real co-user and the second tangible instrument corresponding to the virtualized instrument is accessible to the real co-user; and using a first actuator in the first infrastructure, moving the at least one shared tangible instrument in the first infrastructure based on movements of the corresponding shared tangible instrument from the real co-user in the second infrastructure.

7. The method of claim 6, further comprising controlling the virtualized participant by artificial intelligence to mimic reactions of the real co-user of the interactive computer program.

8. The method of claim 6, further comprising, using a second actuator in the second infrastructure, moving the corresponding shared tangible instrument in the second infrastructure based on movements of the at least one shared tangible instrument from the at least one user in the infrastructure.

9. The method of claim 6, wherein the first portion of the cockpit of the simulated vehicle replicated in the first infrastructure is different from the second portion of the cockpit of the simulated vehicle replicated in the second infrastructure.

* * * * *